(12) United States Patent
Stephan (10) Patent No.: US 11,215,229 B2
(45) Date of Patent: Jan. 4, 2022

(54) BEARING ASSEMBLY, USE OF THE BEARING ASSEMBLY, AND METHOD FOR MANUFACTURING THE BEARING DEVICE

(71) Applicant: AKTIEBOLAGET SKF, Gothenburg (SE)

(72) Inventor: Bernd Stephan, Schweinfurt (DE)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 16/821,668

(22) Filed: Mar. 17, 2020

(65) Prior Publication Data

US 2020/0362915 A1 Nov. 19, 2020

(30) Foreign Application Priority Data

May 13, 2019 (DE) .......................... 102019206917.7

(51) Int. Cl.
| | | |
|---|---|---|
| *F16C 33/58* | (2006.01) | |
| *F16C 43/04* | (2006.01) | |
| *F16C 19/38* | (2006.01) | |
| *F16C 19/49* | (2006.01) | |

(52) U.S. Cl.
CPC .......... *F16C 33/585* (2013.01); *F16C 19/385* (2013.01); *F16C 19/495* (2013.01); *F16C 43/04* (2013.01)

(58) Field of Classification Search
CPC ...... F16C 19/38; F16C 19/383; F16C 19/385; F16C 19/386; F16C 19/492; F16C 19/495; F16C 19/497; F16C 33/585; F16C 33/605; F16C 43/04; F16C 43/06; B60B 27/001; B60B 27/0026; B60B 27/0031; B60B 27/0094

See application file for complete search history.

(56) References Cited

U.S. PATENT DOCUMENTS

| | | | | |
|---|---|---|---|---|
| 1,941,460 | A * | 1/1934 | Boden ................... | F16C 19/385 384/571 |
| 1,949,824 | A * | 3/1934 | Buckwalter ........... | F16C 19/386 384/571 |
| 4,248,487 | A * | 2/1981 | Asberg ................... | F16C 23/06 384/494 |
| 5,037,214 | A * | 8/1991 | Dougherty .............. | F16C 43/04 384/571 |
| 5,074,680 | A * | 12/1991 | Hoch ...................... | F16C 43/08 384/560 |
| 5,494,358 | A * | 2/1996 | Dougherty ............ | B60B 27/001 384/448 |
| 7,748,909 | B2 * | 7/2010 | Komori ................. | B60B 27/001 384/544 |
| 8,465,211 | B2 * | 6/2013 | Dougherty .......... | F16C 33/4694 384/589 |
| 9,347,493 | B2 * | 5/2016 | Haile .................... | F16C 33/583 |

* cited by examiner

*Primary Examiner* — James Pilkington
(74) *Attorney, Agent, or Firm* — J-TEK Law PLLC; Scott T. Wakeman; Mark A. Ussai (57) ABSTRACT

A bearing assembly includes an outer element and an inner element and at least two rows of rolling elements supporting the inner element in the outer element for relative rotation. The outer element includes two surface regions for contact with the rolling elements, and the inner element includes two surface regions for contact with the rolling elements, and the rolling elements of at least one of the rows are rollers.

19 Claims, 5 Drawing Sheets

BEARING ASSEMBLY, USE OF THE BEARING ASSEMBLY, AND METHOD FOR MANUFACTURING THE BEARING DEVICE

CROSS-REFERENCE

This application claims priority to German patent application no. 10 2019 206 917.7 filed on May 13, 2019, the contents of which are fully incorporated herein by reference.

TECHNOLOGICAL FIELD

The disclosure is directed to a bearing assembly, a use of the bearing assembly, and a method for manufacturing the bearing device.

BACKGROUND

Bearing assemblies, for example, wheel bearings, are known from the prior art, and comprise raceway elements and two axially spaced rows of rolling elements that are provided for rolling on the raceway elements so that a rolling-element bearing is formed. Various embodiments of bearing assemblies are known here. In one embodiment the rolling elements of a wheel bearing are embodied as balls. A raceway element is embodied as an outer ring that includes two raceways for the two rows of balls. A second raceway element is embodied as an inner ring. In order that the wheel bearing is assemblable, the inner ring includes only one raceway for one row of the rolling elements. The inner ring also includes a recess into which a further raceway element is insertable that includes the raceway for the other row of the rolling elements. This further raceway element is inserted after the introduction of the corresponding ball row and is connected to the inner ring, for example, by orbital forming.

SUMMARY

An aspect of the disclosure is to provide an improved bearing assembly that can be used in in particular as a wheel bearing. A further aspect of the disclosure is to provide a method for manufacturing the bearing assembly.

The disclosure is based inter alia on the recognition that numerous bearing assemblies and in particular wheel bearing assemblies are relatively complexly formed and require a plurality of components and method steps for their manufacture. In this respect a simplification of the design and manufacture is desirable. Here the weight of the bearing and the occurring loads inter alia are to be taken into account. In the case of wheel bearing assemblies this relates in particular to the high axial and radial loads during cornering.

Accordingly a bearing assembly comprising an outer element and an inner element is provided as an embodiment of the disclosure; the outer element and inner element are supported with respect to each other in the manner of a rolling-element bearing via at least two rows of rolling elements, wherein the outer element includes two surface regions for contact with the rolling elements, and the inner element includes two surface regions for contact with the rolling elements, wherein the rolling elements of at least one of the rows are embodied as rollers.

The outer element can be embodied as an outer ring in which two rolling-element bearing raceways are formed. Here the raceways are formed directly in the outer ring, i.e., the rolling elements roll directly on the outer ring. The inner element can be embodied as an inner ring in which two rolling-element bearing raceways are formed. By designing the rolling elements of one of the rows as rollers it is possible to assemble the bearing assembly even when a highly loadable rolling-element bearing is to be provided, and accordingly a large number of rolling elements per row and a large number of rollers is to be provided. With relatively low constructive cost the load rating of the bearing assembly can thus be designed relatively high. Thus with embodiments of the bearing assembly according to the disclosure, during assembly of the bearing assembly the rollers can be introduced between the outer element and the inner element and brought into contact with the surface regions even when these regions already lie radially one-inside-the-other and the inner element here lies nearly or completely centered in the outer element. This is not possible with known bearing embodiments, where, for example, in the case of two rows of balls the inner ring must lie eccentrically in the outer ring so that the balls of the second row are fillable. Only a limited number of balls is fillable here, so that the load rating of the bearings is correspondingly limited. In order to achieve higher load ratings by the use of more rolling elements per row, it is therefore common with known bearings to divide the outer ring or the inner ring, i.e., not to embody it one-piece. A "half" of the outer or inner ring is thus installable after the second rolling element row.

The rollers can preferably be embodied as tapered rollers, which due to the shape makes possible an easy insertability during installation, with simultaneous good axial and radial load-bearing capacity. This can also be achieved with obliquely disposed cylindrical rollers. The use of cylindrical rollers can be advantageous when the radial load components are rather low.

In one preferred embodiment of the disclosure a retaining element for the rollers is included that is held on the inner element or on the outer element and includes a slip surface for the rollers. The rollers can thus be guided and held on the inner or outer element. The retaining element can be embodied as a separate component, for example, in the form of a retaining ring. After the introduction of the rollers it can be held on the outer element or the inner element. By optimizing the retaining position a defined preload can be applied to the rollers via the slip surface.

In one preferred embodiment of the disclosure the inner element or the outer element includes an at least partially radially extending abutment surface against which the retaining element abuts. The retaining element can thus be installed in a simple manner. For example, a projection generated on the inner or outer element can serve for attaching the retaining element.

One preferred embodiment of the disclosure includes a bearing cage for guiding the rollers, wherein the bearing cage is configured such that it is at least temporarily radially expandable. The bearing cage can include, for example, an interruption, so that it is flexible and can be brought over the inner element during the installation. The other row of rolling elements can also be guided by a second bearing cage.

In one preferred embodiment of the disclosure the bearing assembly is used for supporting a vehicle wheel unit of a motor vehicle. The bearing assembly is consequently preferably embodied as a wheel bearing assembly. In known wheel bearings, separate inner ring or outer ring elements, each having a rolling-element raceway, are often provided for ensuring installability; the separate inner ring or outer ring elements are brought together after the rolling elements have been introduced in order to form the wheel bearing. In embodiments of the disclosure, both the outer element and the inner element are embodied as one-piece components.

As one embodiment of the disclosure, a method for manufacturing the bearing assembly is provided, including the following method steps:

manufacturing the inner element, the outer element, and the rolling elements of the first row and of the rollers of the second row, introducing a first of the rows of rolling elements into the outer element, introducing the inner element into the outer element such that the first row of rolling elements is contacted by the corresponding surface regions of the inner element and of the outer element, introducing the rollers between the outer element and the inner element such that the rollers are contacted by the corresponding surface regions of the inner element and of the outer element.

The retaining element is preferably inserted after introducing the rollers of the second row of rolling elements.

In one embodiment of the disclosure it is furthermore provided to carry out the following method steps prior to the introduction of the retaining element:

measuring the distance of an outer end side of the rollers from the abutment surface for the retaining element, depending on the measured distance, processing the retaining element such that with later abutting of the retaining element against the abutment surface, the end side of the rollers can be acted upon by the slip surface of the retaining element with a predetermined contact force.

Another aspect of the disclosure comprises a bearing assembly having a unitary outer ring having a first raceway and a second raceway, a unitary inner ring having a first raceway opposing the first raceway of the outer ring and a second raceway opposing the second raceway of the outer ring, and a first plurality of rolling elements in direct contact with the first raceway of the outer ring and the first raceway of the inner ring. The inner ring and the outer ring are configured such that a second plurality of rolling elements comprising rollers are insertable between the second raceway of the outer ring and the second raceway of the inner ring when the first plurality of rolling elements are in contact with both the first raceway of the outer ring and the first raceway of the inner ring.

The bearing assembly can thus be adjusted flexibly with respect to the preload or bearing clearance, and compensate for manufacturing tolerances during the assembly. An otherwise often common pairing of the components can be omitted, which further simplifies the assembly process.

Advantages, features, and details of the invention arise from the exemplary embodiments of the invention described below with reference to the Figures.

DETAILED DESCRIPTION

Figure 1:
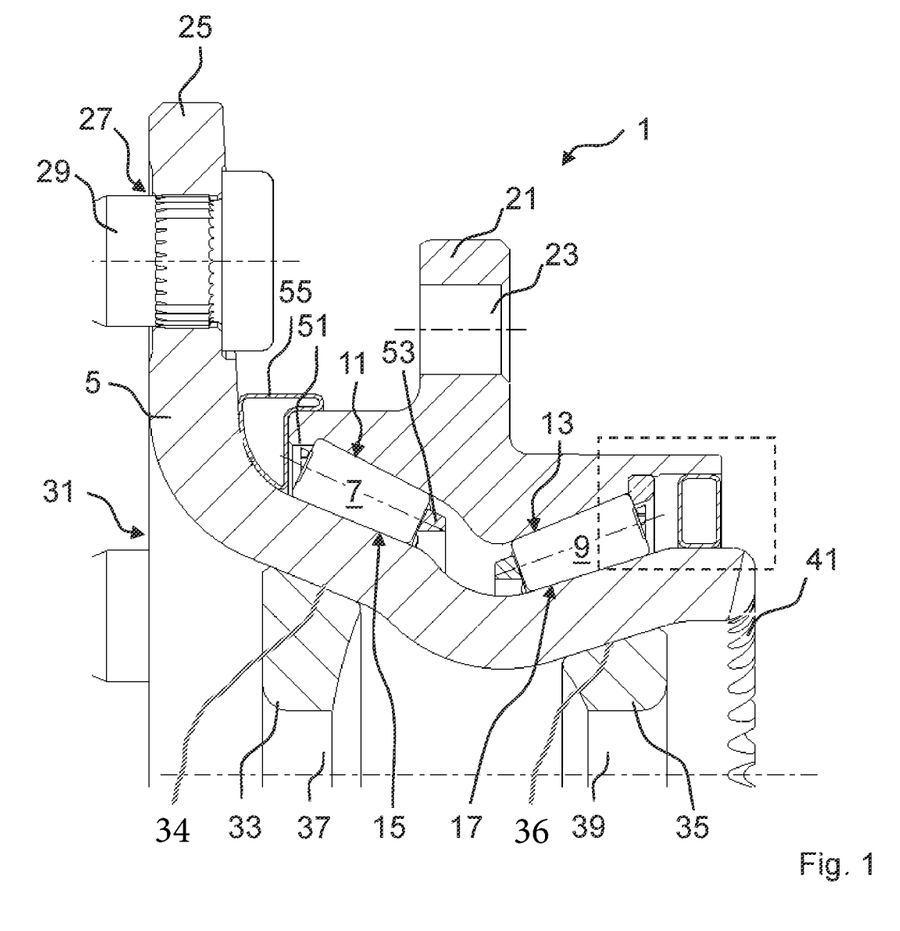
FIG. 1 is a sectional elevational view of an upper region of a wheel bearing assembly according to an embodiment of the present invention.

FIG. 1 shows the upper region of a longitudinal section through a wheel bearing assembly 1 according to one embodiment of the disclosure that is suitable for the retaining and supporting a wheel on a motor vehicle. It comprises an outer ring 3 and an inner ring 5, wherein the inner ring 5 is disposed inside the outer ring 3. The wheel bearing assembly 1 further includes two axially spaced rows of rolling elements that are listed here as tapered rollers 7 and 9. The tapered rollers 7 and 9 are arranged in an O configuration. The outer ring 3 includes two raceways 11 and 13 for the tapered rollers 7 and 9. The inner ring 5 also includes two raceways 15 and 17 for the tapered rollers 7 and 9. The tapered rollers 7 are disposed between the raceways 11 and 15 and roll on them. The tapered rollers 9 are disposed between the raceways 13 and 17 and roll on them. The inner ring 5 is thus rotatably supported with respect to the outer ring 3.

On the outer ring 3 a radial projection 21 is provided into which holes 23 are introduced. The outer ring 3 can be connected to a motor vehicle using the projection 21. The inner ring 5 includes a formation 25 spaced axially from the tapered rollers 7; the formation 25 includes holes 27 to which a wheel unit of a vehicle can be attached. In FIG. 1 a screw 29 is indicated.

In comparison to known embodiments, the inner ring 5 is manufactured from one piece, so that no separate raceway element is required for the tapered rollers 9. For reducing the total weight of the wheel bearing 1, the inner ring 5 is embodied as thin as possible, thus it includes a relatively large, radially inner-lying cavity 31 that expands in a funnel-shaped manner in the axial course. In the cavity 31 two support elements 33 and 35 are disposed below (radially inward of) the raceways 13 and 17 such that the inner ring 5 is supported in the region of the raceways 13 and 17, where the load abuts via the tapered rollers 7 or 9. The radially outer surfaces of the support elements 33 and 35 are conical, that is, they are radially outwardly tapered in a manner corresponding to the contour of the inner ring 5, which includes conical portions 34, 36 radially inward of the raceways 15 and 17. The support elements 33 and 35 also include radially inner-lying annular recesses 37 and 39, into which a shaft end of a drive shaft can be introduced and releasably connected to the inner ring by a nut. The conical portions 34, 36 on the inside of the inner ring 5 are substantially parallel to their associated raceways 15, 17 on the outside of the inner ring 5, and a contour of an inner surface of the inner ring 5 from a point radially inward of the first raceway 15 to a point radially inward of the second raceway 17 follows a contour of an outer surface of the inner ring 5 from a point on the first raceway 15 to a point on the second raceway 17. The shaft end can also include a shoulder that presses against the support element 35 so that the support element 35 is pressed against the inner ring 5. The inner ring 5 includes an axially outer-lying toothing 41 that can be brought into connection with a corresponding counterpart of the drive shaft. The inner ring 5 can thus be set into rotation. Alternatively a radial toothing can be introduced in the support element 33 and/or 35.

Alternatively the support element 35 can be a component of the shall end, i.e., fixedly connected to the shaft end or formed therefrom. A toothing can also be introduced radially outward into the shaft and be correspondingly formed in the support element 35 or in the inner ring 5.

Due to the design of the outer ring 3 and of the inner ring 5, the power density of the wheel bearing 1 can be significantly increased in comparison to known designs. The wheel bearing 1 is particularly compact, i.e., in particular axially short, since relatively few components are used. The outer ring 3 and the inner ring 5 can be embodied as forged parts that are or are shaped so that no machining methods need to be used for manufacturing. Consequently the material yield is also optimized.

The outer ring 3 includes a flange 51 on which the tapered rollers 7 are guided. The tapered rollers 7 are also guided by a cage 53. Between the outer ring 3 and the inner ring 5, a seal 55, only schematically depicted here, is disposed in the region of the tapered rollers 7.

Figure 2:
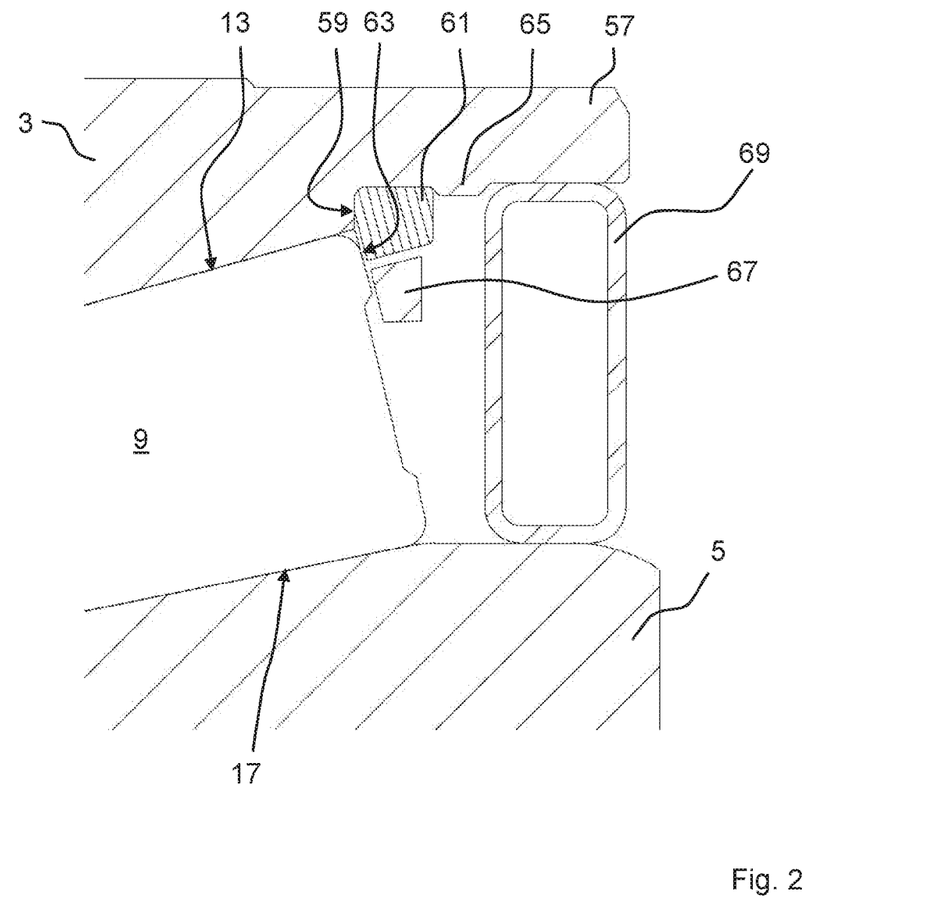
FIG. 2 is a detail view of region II in FIG. 1 showing a retaining ring mounted on an outer ring.

FIG. 2 is an enlarged version of the broken line rectangle region II in FIG. 1 to show details.

In the region of the tapered rollers 9, the outer ring 3 includes an axial, radially encircling projection 57 that forms a radial shoulder 59 at the end of the raceway 13. At the shoulder 59 there is a retaining ring 61 that includes a slip surface 63 for the tapered rollers 9. The retaining ring 61 is axially held between the shoulder 59 and a projection 65 so that it is pressed axially against the shoulder 59. The tapered rollers 9 are guided by a cage 67. Between the outer ring 3 and the inner ring 5, a seal 69 is held in the region of the projection 57.

The retaining ring 61 can be embodied, for example, from steel or a sintered material including introduced lubricant. The contact between the tapered rollers 9 and the slip surface 63 can thus be optimized with respect to friction. The slip surface 63 is also embodied in a manner corresponding to the course of the abutting end side of the tapered rollers 9, in the present exemplary embodiment thus obliquely with respect to the axial or radial direction.

For the assembly of the wheel bearing 1, the outer ring 3 and the tapered rollers 7 are first brought together with the cage 53 and the seal 55, as with known embodiments. The tapered rollers 9 are then brought into the space formed between outer ring 3 and inner ring 5, and the cage 67 is inserted. For this purpose the cage 67 is interrupted a point of its circumference so that the cage 67 can be expanded in order to fit over the corresponding end of the inner ring 5.

According to the manufacturing tolerances of the components, the axially outer end side of the tapered rollers 9 has a different-sized offset with respect to the shoulder 59 with each wheel bearing 1. The end side will thus, for example, project axially past the shoulder 59 by a few micrometers; this will be more or fewer micrometers depending on the manufacturing tolerance. Alternatively the end side can also lie more or less behind the shoulder. The offset is determined during assembly by measuring, after the tapered rollers 9 have been inserted and the bearing has been rolled-on. In accordance with the measurement result, the retaining ring 61, is, for example, finished by machining, so that on the one hand it abuts axially against the shoulder 59, and on the other hand the tapered rollers 9 can slip against the slip surface 63 with defined preload. Alternatively and depending on the application a defined bearing clearance can also be set. A complex pairing of the tapered rollers and the rings can be omitted.

Thus it can be necessary, for example, to remove more or less material from the retaining ring 61 in the region of the slip surface 63, when the tapered rollers 9 project axially beyond the shoulder 59. It can also be necessary to remove material in the region of the retaining ring 61 that abuts against the shoulder 59, when the shoulder 59 projects axially beyond the end side of the tapered rollers 9.

The retaining ring 61 is then inserted. At this point in time in the assembly the projection 65 is not yet present; it is only generated after the insertion of the retaining ring 61 by staking. Alternatively the retaining ring 61 can also be connected to the outer ring 3 by adhering, welding, screwing, or soldering. Finally the seal is inserted.

Figure 5:
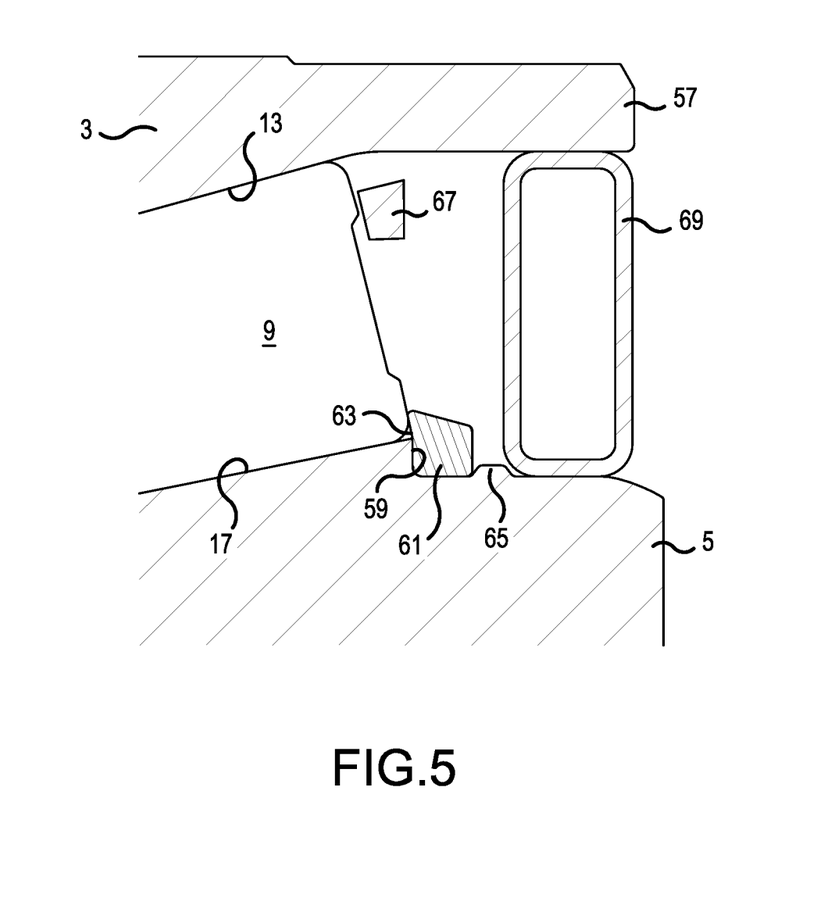
FIG. 5 is a sectional elevational view similar to the detail view of FIG. 2 showing a retaining ring mounted on an inner ring.

Alternatively the retaining ring 61 can be held on the inner ring 5 as illustrated in FIG. 5.

Due to the use of a retaining ring 61, both the outer ring 3 and the inner ring 5 can be embodied one-piece, i.e., the raceways 11 to 17 are formed in the outer ring 3 or in the inner ring 5. Neither the outer ring 3 nor the inner ring 5 need to be embodied split. Thus no separate raceway elements are required.

Due to the use of tapered rollers 7 and 9 in both rows of rolling elements the wheel bearing is particularly loadable and can be used, for example, for trucks.

Figure 3:
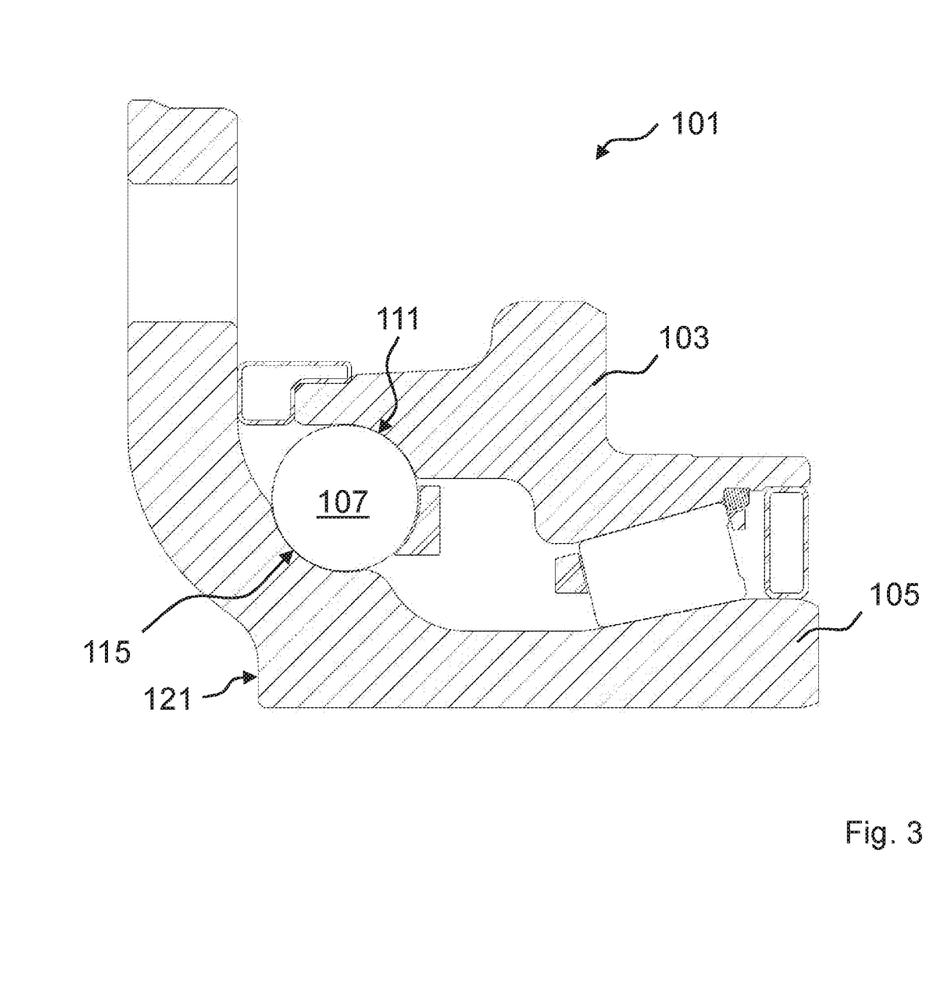
FIG. 3 is a sectional elevational view of an upper region of a wheel bearing assembly according to another embodiment of the present invention.

In FIG. 3, a wheel bearing 101 is depicted as a further embodiment of the disclosure. It is embodied largely identical to the wheel bearing 1 of FIG. 1, wherein the reference numbers have been adopted. In the following the differently embodied parts will primarily be discussed. Thus the wheel bearing 101 includes a row of balls 107 instead of the tapered rollers 7. Accordingly raceways 111 and 115 are formed in the outer ring 103 or inner ring 105. In comparison to the embodiment of FIG. 1, the inner ring 105 is formed thicker in the region of the raceway 115, so that no support element is required and the inner ring 105 can support loads required for use. The inner ring 105 includes an abutment surface 121 for the abutment of the nut of the shaft end of the drive shaft. The wheel bearing 101 can be used, for example, for automobiles or light commercial vehicles.

A correspondingly thicker-embodied inner ring in the region of the left raceway can also be provided when the left row of rolling elements is embodied as tapered rollers. Thus with a slightly modified embodiment of FIG. 1, the support element 35 could also be omitted.

In further exemplary embodiments numerous details can be optimized, such as, for example, the material thickness of the inner ring and the axial distance between the rolling elements regions. Thus a wheel bearing can be provided that is as compact as possible, weight-optimized, simple to manufacture, and configurable for various purposes and loads.

Instead of the tapered rollers 7 and 9, other types of rollers, such as, for example, obliquely disposed cylindrical rollers, can also be used.

Figure 4:
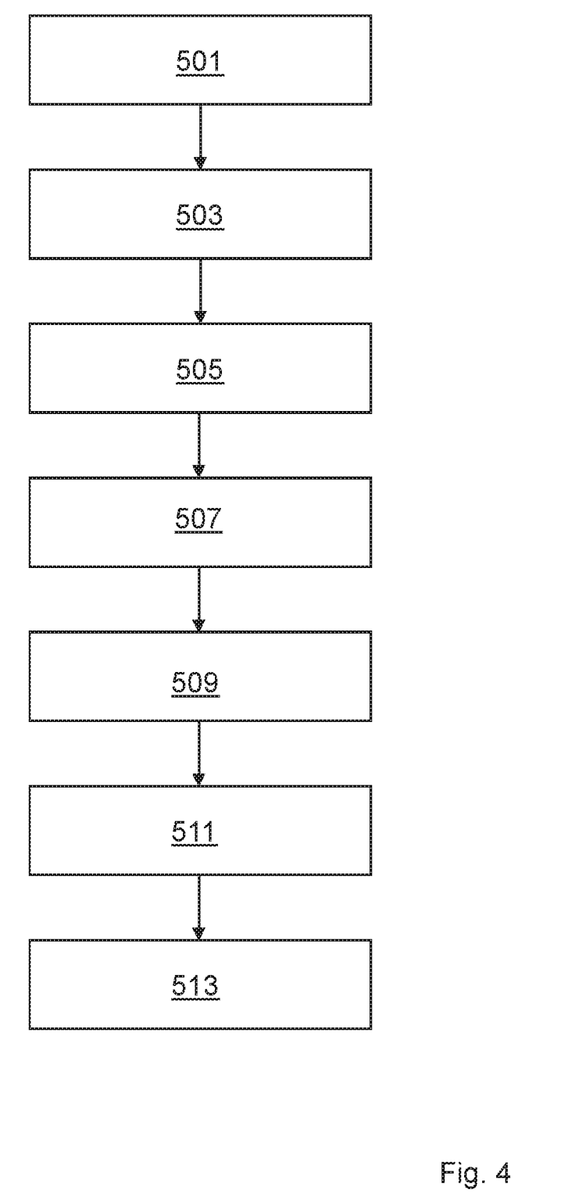
FIG. 4 is a flow chart illustrating a method according to the present disclosure.

In FIG. 4 a method according to a preferred embodiment of the disclosure is schematically depicted.

In a first method step 501 the outer ring 3 or 103, the inner ring 5 or 105, and the rolling elements are manufactured. In a second method step 503 the first of the rows of rolling elements is introduced into the outer ring 3 or 103 and held by a cage. In a third method step 505 the inner ring 5 or 105 is introduced into the outer ring 3 or 103 so that first row of rolling elements, i.e., the tapered rollers 7 or the halls 107, is contacted by the corresponding raceways 11 and 15 or 111 and 115. In a fourth method step 507 the tapered rollers 9 are between the outer ring 3 or 103 and the inner ring 5 or 105 such that they are contacted by the raceways 13 and 17. The cage 67 is also inserted.

In a fifth method step 509 the spacing of an outer end side of the tapered rollers 7 and the shoulder 59 is first measured. Here the minimum distance is preferably measured. In a sixth method step 511, in a manner depending on the measured distance the retaining ring 61 is processed so that with the later abutting of the retaining ring 61 against shoulder 59 the end sides of the tapered rollers 9 are acted upon by the slip surface 63 with a predetermined contact force. Thus the preload or the bearing clearance of the bearing is set. Depending on the measured distance, the processing of the retaining ring 61 can be a machining, wherein material is removed from the retaining ring 61 in the region where the slip surface 63 lies. This occurs in the cases when the end side of the tapered roller 9 projects axially over the shoulder 59 as is depicted in FIG. 2. Here the amount of material to be removed is measured at the measured distance and the preload or the bearing clearance to be set.

In a seventh method step 513 the retaining ring 61 is inserted so that it abuts against shoulder 59, and the slip surface 63 exerts the previously specified force on the tapered rollers 9. For this purpose the retaining ring 61 can be pressed against the shoulder 59 using a tool. The projection 65 is then generated by staking or similar, so that the retaining ring 61 is held on the shoulder 59.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved bearing assemblies.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

What is claimed is:

1. A bearing assembly comprising:
an outer element and an inner element and at least two rows of rolling elements supporting the inner element in the outer element for relative rotation,
wherein the outer element includes a first raceway and a second raceway for contact with the rolling elements, and the inner element includes a first raceway and a second raceway for contact with the rolling elements,
wherein the rolling elements of at least one of the rows are embodied as rollers,
wherein the outer element comprises a unitary outer bearing ring and the inner element comprises a unitary inner bearing ring,
wherein the rolling elements include a first plurality of rolling elements between the first raceway of the outer bearing ring and the first raceway of the inner bearing ring and a second plurality of rolling elements, the second plurality of rolling elements comprising rollers,
wherein the first raceway of the outer ring is bounded by a continuous flange formed integrally with the outer ring at an axially outer end of the outer ring,
wherein the outer ring and the inner ring are configured such that the second plurality of rolling elements are insertable between the second raceway of the outer ring and the second raceway of the inner ring when the first plurality of rolling elements are in direct contact with both the first raceway of the outer ring and the first raceway of the inner ring, and
wherein the first plurality of rolling elements and the second plurality of rolling elements are arranged in an O-configuration.

2. The bearing assembly according to claim 1, further comprising a retaining element for the rollers that is held on the inner element or on the outer element and includes a slip surface for the rollers.

3. The bearing assembly according to claim 2, wherein the inner element or the outer element includes an at least partially radially extending abutment surface, against which the retaining element abuts.

4. The bearing assembly according to claim 1, further comprising a bearing cage for guiding the rollers, wherein the bearing cage is configured such that it is at least temporarily radially expandable.

5. The bearing assembly according to claim 1, wherein the inner element includes a radially inner-lying recess into which a shaft part connectable to the inner element is insertable.

6. The bearing assembly according to claim 1, wherein the outer element includes a retaining element, by which the bearing assembly is retainable on a housing.

7. A motor vehicle wheel unit including the bearing assembly according to claim 1.

8. A bearing assembly comprising:
a unitary outer ring having a first raceway and a second raceway,
a unitary inner ring having a first raceway opposing the first raceway of the outer ring and a second raceway opposing the second raceway of the outer ring and having a radially inner surface, a first portion of the radially inner surface radially inward of the first raceway of the inner ring and a second portion of the radially inner surface radially inward of the second raceway being conical,
a first plurality of rolling elements in direct contact with the first raceway of the outer ring and the first raceway of the inner ring, and
a first support element having an annular radially inner surface and having a conical radially outer surface in contact with the conical portion of the inner surface of the inner ring radially inside the first raceway,
wherein the inner ring and the outer ring are configured such that a second plurality of rolling elements comprising rollers are insertable between the second raceway of the outer ring and the second raceway of the inner ring when the first plurality of rolling elements are in contact with both the first raceway of the outer ring and the first raceway of the inner ring.

9. The bearing assembly according to claim 8, including the second plurality of rolling elements and a retaining ring mounted between the inner ring and the outer ring in direct contact with axial ends of the second plurality of rolling elements.

10. The bearing assembly according to claim 9,
wherein the first plurality of rolling elements and the second plurality of rolling elements are arranged in an O-configuration.

11. The bearing assembly according to claim 8,
including a second support element having a radially outer surface in contact with the conical portion of the inner surface radially inside the second raceway.

12. The bearing assembly according to claim 11,
wherein the first portion of the radially inner surface is parallel to the first raceway and the second portion of the radially inner surface is parallel to the second raceway.

13. The bearing assembly according to claim 8,
wherein the first portion of the radially inner surface is parallel to the first raceway.

14. The bearing assembly according to claim 8,
wherein a contour of an inner surface of the inner ring from a point radially inward of the first raceway to a point radially inward of the second raceway follows a contour of an outer surface of the inner ring from a point on the first raceway to a point on the second raceway.

15. A method comprising:
providing a unitary outer ring having a first raceway and a second raceway,
providing a unitary inner ring having a first raceway and a second raceway and a radially inner surface, the radially inner surface including a conical portion radially inward of the first raceway,
placing a first plurality of rolling elements mounted in a cage, against the first raceway of the outer ring,
with the first plurality of rolling elements placed against the first raceway of the outer ring, inserting the inner ring axially through the outer ring such that the first plurality of rolling elements contact the first raceway of the inner ring and are held against the first raceway of the outer ring by the inner ring and such that the second raceway of the inner ring opposes the second raceway of the outer ring, and
inserting a second plurality of rolling elements, comprising rollers, into a space between the second raceway of the inner ring and the second raceway of the outer ring.

16. The method according to claim 15, including:
after inserting the second plurality of rolling elements, inserting a retaining ring into a space between the inner ring and the outer ring and in contact with axially outer surfaces of the rollers to form a flange for guiding the rollers.

17. The method according to claim 16,
wherein the first plurality of rolling elements and the second plurality of rolling elements are arranged an O-configuration.

18. The method according to claim 16, further including, prior to inserting the retaining element:
measuring the distance of an outer end side of the rollers from the abutment surface for the retaining element, and
depending on the measured distance, processing the retaining element such that with later abutting of the retaining element against the abutment surface, the end side of the rollers is acted upon by the slip surface of the retaining element with a predetermined contact force.

19. The method according to claim 15, including inserting a first support element into an interior of the inner ring such that a radially outer surface of the first support element contacts the conical portion of the radially inner surface of the inner ring.

* * * * *